No. 714,213. Patented Nov. 25, 1902.
J. T. MARSHALL.
VALVE GEAR FOR FLUID PRESSURE ENGINES.
(Application filed Apr. 25, 1901.)
(No Model.) 2 Sheets—Sheet 1.
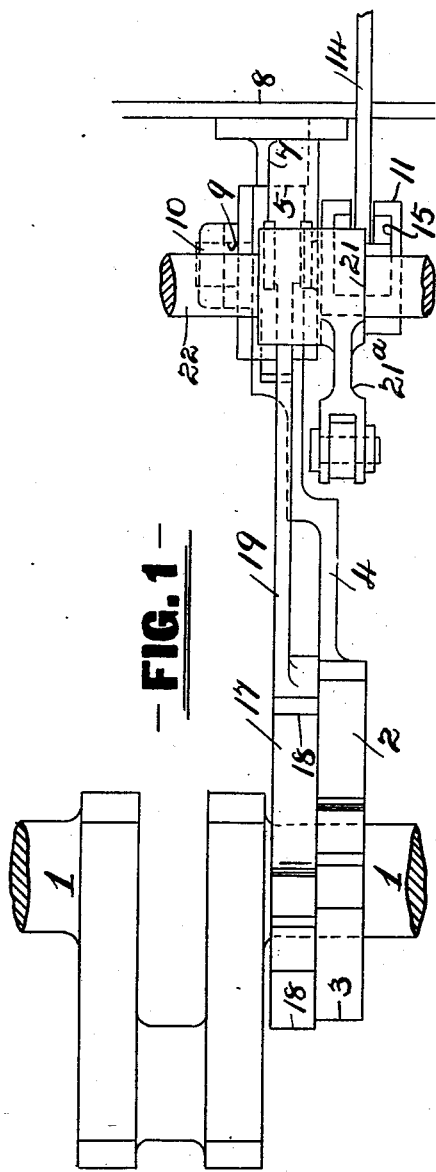
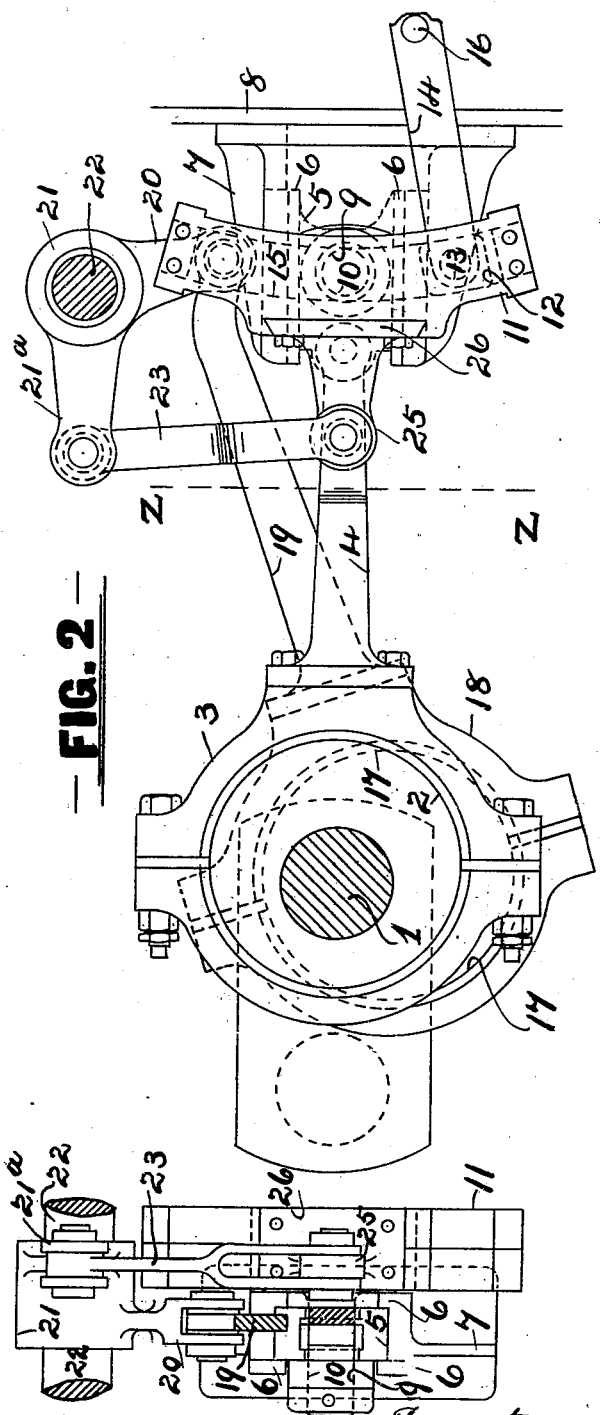
Witnesses
George Frederick Gadd.
Arthur Gadd.
Inventor
James Thompson Marshall
per William Gadd
Attorney.

No. 714,213. Patented Nov. 25, 1902.
J. T. MARSHALL.
VALVE GEAR FOR FLUID PRESSURE ENGINES.
(Application filed Apr. 25, 1901.)
(No Model.) 2 Sheets—Sheet 2.

Witnesses
George Frederick Gadd.
Arthur Gadd.

Inventor
James Thompson Marshall
per William Gadd
Attorney.

THE NORRIS PETERS CO., PHOTO-LITHO., WASHINGTON, D. C.

UNITED STATES PATENT OFFICE.

JAMES THOMPSON MARSHALL, OF LEEDS, ENGLAND.

VALVE-GEAR FOR FLUID-PRESSURE ENGINES.

SPECIFICATION forming part of Letters Patent No. 714,213, dated November 25, 1902.

Application filed April 25, 1901. Serial No. 57,387. (No model.)

*To all whom it may concern:*

Be it known that I, JAMES THOMPSON MARSHALL, a subject of the King of Great Britain and Ireland, residing at Leeds, in the county of York, England, have invented Improvements in Valve-Gear for Fluid-Pressure Engines, of which the following is a specification.

This invention relates to improvements in the valve-gear of fluid-pressure engines, and has for an object to construct valve-gear that shall operate the valve or valves of the engine in such a manner that the valve or valves will quickly open the inlet port or ports of the cylinder or cylinders to the full extent, then dwell or remain stationary for a time, and then suddenly close such inlet port or ports, so that motive fluid can enter the cylinder or cylinders of the motor without liability of being wire-drawn and that when a valve-gear according to this invention is linked up the exhaust port or ports is or are not so reduced in area as to cause a back pressure.

According to this invention the valve of a fluid-pressure engine is actuated from the crank-shaft through an oscillating link or lever, which is also moved bodily to and fro, the oscillation of the link or lever about its pivot and its to-and-fro movement being obtained by two eccentrics the angular positions of which in relation to each other and to the crank are such that the opening and closing of the valve are caused by the forward-and-backward oscillations of the link or lever, supplemented by the forward-and-backward bodily movements of the link or lever, while the dwell of the valve is caused by the backward-and-forward oscillations of the link or lever being neutralized by the forward-and-backward bodily movements of the link or lever.

Referring to the accompanying illustrative drawings, Figures 1 and 2 are respectively a plan and an elevation of valve-gear constructed according to this invention; Fig. 3, a cross-section on the line Z Z, Fig. 2.

Figure 4:
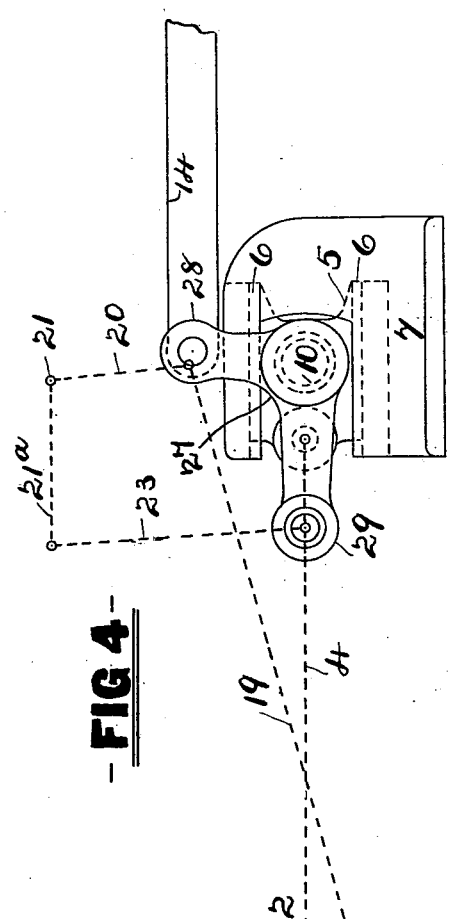
Figures 5, 7:
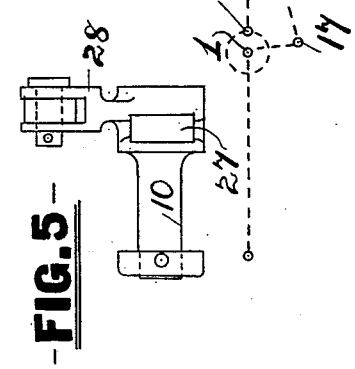

Upon the crank-shaft 1 of an engine, such as a locomotive or a reversing-engine having two cylinders, is secured an eccentric 2, that is placed in advance—say one hundred and eighty degrees—of the crank, with a throw equal to the lap and lead of the valve and connected by a strap 3 and connecting-rod 4 to a slide 5, which works in guides 6 in a bracket 7, secured to a bridge-plate 8, connected to the horn-plates of a locomotive, Figs. 1 and 2, or to the bed-plate in the case of a stationary engine, Figs. 4 and 5. The slide 5 is formed with a bearing 9, in which is mounted a pin 10, that is carried by a curved slotted link 11. A die 12, mounted on a pin or stud 13 on the end of the connecting-rod 14 of the slide-valve, works in the slot 15 of the link 11.

In close proximity to the eccentric 2 is secured a second eccentric 17, that is placed in advance of the eccentric 2—say about ninety degrees—and has a throw that is sufficient to move the valve so as to fully open the inlet-port of the cylinder. The eccentric 17 is connected by a strap 18 and connecting-rod 19 to one arm 20 of a double-armed lever 21, that is mounted on a shaft 22, carried in bearings secured to the engine-framing, the other arm 21ª of the lever being connected by a link 23 to an arm 25 on a bracket 26, secured to the back of the curved slotted link 11. The valve-rod 14 can be operated by the usual reversing-gear, which is connected thereto at or about the point 16.

Figure 6:
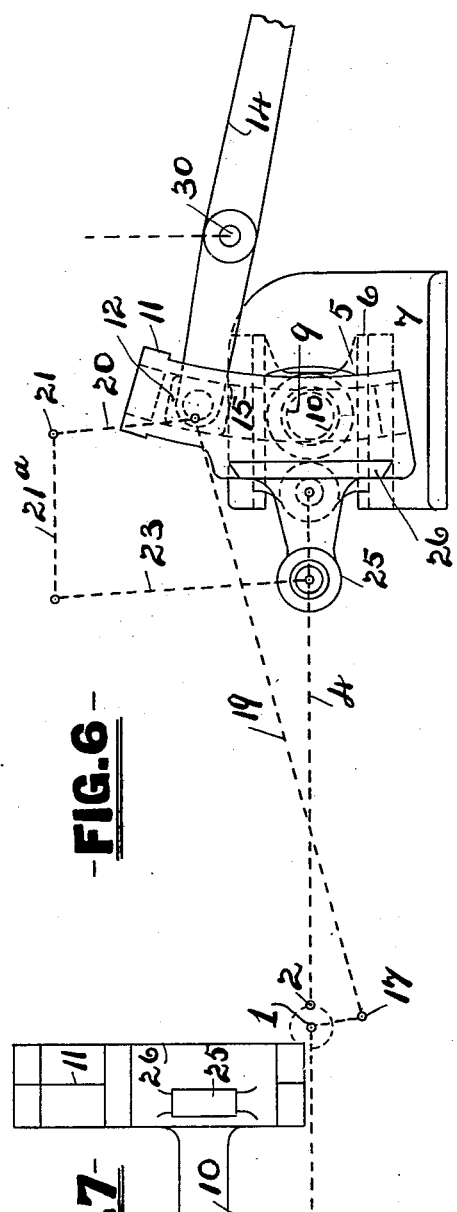

In single-cylinder reversing-engines only one set of eccentrics and valve-gear, such as above described, is needful. In single-cylinder non-reversing engines governed by a throttle-valve the same arrangement of eccentrics and valve-gear is used; but the curved slotted link 11 and arm 25 are replaced by a double-armed lever 27 and 28, Figs. 4 and 6, carried by the pin 10, which is mounted and oscillates in a slide 5, one arm 27 of the lever being connected by the link 23 to the arm 21ª of the double-armed lever 20 21 and the other arm 28 being connected direct to the valve-rod 14, or in some cases with single-cylinder non-reversing engines the curved link extends only from one side of the pin 10, Figs. 6 and 7, the arm 25 being connected by the link 23 to the arm 21ª of the lever 20 21. The connecting-rod 14 of the valve is connected at 30 with the governing device for regulating the speed of the engine by automatically moving the die 12 in the curved slot 15.

By the above-described arrangement of valve-gear it will be seen that the valve is moved quickly in either direction, opening the inlet-port to the full extent, so as to admit fluid-pressure to the cylinder. Then while the crank is moving to and past the top center the valve dwells or remains stationary for a time and allows the exhaust fluid from the cylinder to flow easily through the exhaust-port. The valve then suddenly moves, closing the inlet-port; but the exhaust-port will not be closed until the middle position of the travel of the valve is reached, thus preventing any considerable back pressure being produced, but only sufficient to assist the crank over the dead-center. When this gear is linked up, the exhaust port or ports is or are never so reduced in area as to cause back pressure.

By this valve-gear the admission of motive fluid may be automatically controlled without the use of separate expansion-valves.

Similar valve-gear may advantageously be used in engines fitted with Corliss or other valves.

What I claim, and desire to secure by Letters Patent, is—

In a valve-gear for fluid-pressure engines, the combination of a link, a slide for supporting the link, parallel guides for the slide attached to the engine-framing, an eccentric, a rod connecting the eccentric to the slide, a second eccentric and rod connecting same to a lever-and-link mechanism supported by the engine-framing, said lever-and-link mechanism also connected to an arm on the link first named, for the purpose and in manner substantially as herein set forth.

Signed at Leeds, in the county of York, England, this 3d day of April, 1901.

JAMES THOMPSON MARSHALL.

Witnesses:
ROBERT EDWIN PEACOCK CRAVEN,
HENRY PALEY.